United States Patent
Hayama

(10) Patent No.: US 9,016,422 B2
(45) Date of Patent: Apr. 28, 2015

(54) SADDLE-RIDE TYPE VEHICLE

(71) Applicant: Honda Motor Co., Ltd., Tokyo (JP)

(72) Inventor: Yoshitaka Hayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/066,262

(22) Filed: Oct. 29, 2013

(65) Prior Publication Data

US 2014/0131127 A1 May 15, 2014

(30) Foreign Application Priority Data

Nov. 9, 2012 (JP) ................................. 2012-247790

(51) Int. Cl.
*B62K 11/00* (2006.01)
*B62K 11/04* (2006.01)

(52) U.S. Cl.
CPC ................. *B62K 11/00* (2013.01); *B62K 11/04* (2013.01)

(58) Field of Classification Search
CPC ................................ B62K 11/00; B62K 11/04
USPC .......... 180/219, 225; 181/212, 227, 251, 238, 181/239, 240, 256; 60/299, 302, 306
See application file for complete search history.

(56) References Cited

U.S. PATENT DOCUMENTS

| | | | | |
|---|---|---|---|---|
| 4,359,865 A | * | 11/1982 | Nakao et al. | 60/313 |
| 6,832,590 B2 | * | 12/2004 | Hattori et al. | 123/195 R |
| 8,028,798 B2 | * | 10/2011 | Koyanagi et al. | 181/251 |

FOREIGN PATENT DOCUMENTS

JP 4727503 B2 7/2011

* cited by examiner

*Primary Examiner* — Joseph Rocca
*Assistant Examiner* — Jacob Knutson
(74) *Attorney, Agent, or Firm* — Westerman, Hattori, Daniels & Adrian, LLP

(57) ABSTRACT

A saddle-ride type vehicle which includes catalyst devices in left and right exhaust flow passages can suppress effect of the catalyst devices on the reach to the ground even if the sizes of catalysts are large. The vehicle includes: exhaust flow passages connected to a multi-cylinder engine and disposed independently on left and right sides of a vehicle body; a first catalyst device provided in a middle of the left exhaust flow passage; a second catalyst device provided in a middle of the right exhaust flow passage; a swing arm pivotally supporting a rear wheel such that the rear wheel is swingable, the saddle-ride type vehicle includes silencers connected to portions of the exhaust flow passages downstream of the first catalyst device and the second catalyst device, and the first catalyst device and the second catalyst device are arranged side by side below the swing arm.

7 Claims, 7 Drawing Sheets

SADDLE-RIDE TYPE VEHICLE

CROSS-REFERENCE TO RELATED APPLICATIONS

The present application claims priority under 35 U.S.C. §119 to Japanese Patent Application No. 2012-247790, filed Nov. 9, 2012, the contents of which are incorporated herein, by reference, in their entirety.

TECHNICAL FIELD

The present invention relates to a saddle-ride type vehicle including a silencer and a catalyst unit for purifying exhaust gas from an engine.

BACKGROUND OF THE INVENTION

A saddle-ride type vehicle such as a motorcycle which includes a vehicle body frame, an engine, and a silencer has been conventionally known. The engine is fixed to the vehicle body frame. The silencer is connected to the engine via an exhaust pipe and reduces an exhaust noise in discharging of the exhaust gas.

In a saddle-ride type vehicle including a multi-cylinder engine having two or more cylinders, there is known a configuration in which exhaust flow passages are separately arranged on left and right sides of a vehicle body. In Japanese Patent No. 4727503, a catalyst unit with a small size is provided in a middle of an exhaust flow passage (see Patent Document 1).

SUMMARY OF THE INVENTION

In the saddle-ride type vehicle, the catalyst unit is located below a driver seat. In such a position, in the case where the driver removes his/her foot from a step and puts his/her foot on the ground when the vehicle is stopped or other cases, the leg is located lateral to the catalyst unit. In a case where, for example, the size of the catalyst unit is large, it is sometimes required to take measures such as providing a heat-shielding protector on a side of the catalyst unit in the left-right direction of the vehicle body. However, disposing the protector on the side of the catalyst unit forces the leg of the driver to be located away from the vehicle body when the vehicle is stopped, and thus adversely affects the reach to the ground.

A saddle-ride type vehicle includes catalyst devices in left and right exhaust flow passages and which can suppress an effect of the catalyst devices on the reach to the ground even if the sizes of catalysts are large.

A first aspect provides a saddle-ride type vehicle including: exhaust flow passages connected to a multi-cylinder engine and disposed independently on left and right sides of a vehicle body; a first catalyst device provided in a middle of the left exhaust flow passage; a second catalyst device provided in a middle of the right exhaust flow passage; and a swing arm pivotally supporting a rear wheel such that the rear wheel is swingable, the saddle-ride type vehicle comprising silencers connected respectively to portions the exhaust flow passages downstream of the first catalyst device and the second catalyst device, wherein the first catalyst device and the second catalyst device are arranged side by side below the swing arm.

In a second aspect, the first catalyst device and the second catalyst device are arranged adjacent to each other with longitudinal directions thereof being along a front-rear direction of the saddle-ride type vehicle.

In a third aspect, the first catalyst device and the second catalyst device are arranged within a width of the swing arm in a width direction with respect to the front-rear direction of the saddle-ride type vehicle.

In a fourth aspect, the multi-cylinder engine is a V-type engine in which left and right V banks are arranged in the vehicle width direction, the exhaust flow passages are formed of exhaust pipes, an inlet of the exhaust pipe forming the left exhaust flow passage is attached to a left side surface of the multi-cylinder engine, and an inlet of the exhaust pipe forming the right exhaust flow passage is attached to a right side surface of the multi-cylinder engine, the vehicle body has a vehicle body frame and the silencers are each attached to the vehicle body frame, and the saddle-ride type vehicle further comprises a stay portion joining the first catalyst device and the second catalyst device to each other.

In a fifth aspect, the saddle-ride type vehicle is provided with a connecting pipe connecting a portion of a side surface of at least one of the first catalyst device and the second catalyst device which faces an outer side of the saddle-ride type vehicle in a width direction with respect to the front-rear direction of the saddle-ride type vehicle and a portion of a side surface of the corresponding silencer which faces an inner side of the saddle-ride type vehicle in the width direction with respect to the front-rear direction of the saddle-ride type vehicle.

In a sixth aspect, the exhaust flow passages are formed of exhaust pipes, at least one of the first catalyst device and the second catalyst device includes a hollow tubular catalyst chamber and a catalyst main body disposed in the catalyst chamber along the front-rear direction, the exhaust pipe upstream of the at least one of the first catalyst device and the second catalyst device is connected to a portion of a side surface of the catalyst chamber which faces an outer side of the saddle-ride type vehicle in the width direction with respect to the front-rear direction of the saddle-ride type vehicle.

In a seventh aspect, the swing arm has a pair of left and right arm portions extending toward a rear of the saddle-ride type vehicle, and at least one of the first catalyst device and the second catalyst device and the corresponding silencer are arranged in a positional relationship overlapping each other in a side view and in a positional relationship in which at least one of the arm portions is interposed therebetween in a plan view.

According to the first aspect, since the first catalyst device and the second catalyst device are arranged side by side below the swing arm, the first catalyst device and the second catalyst device can be compactly arranged in a dead space below the swing arm. Accordingly, it is possible to arrange the first catalyst device and the second catalyst device away from a position where the driver of the saddle-ride type vehicle puts his/her foot on a road surface when the vehicle is stopped, and also to maintain the excellent reach to the ground.

According to the second aspect, since the first catalyst device and the second catalyst device are arranged adjacent to each other with the longitudinal directions thereof being along the front-rear direction of the saddle-ride type vehicle, the first catalyst device, the second catalyst device, and the exhaust flow passages can have simple structures. In addition, the two of the first catalyst device and the second catalyst device can be compactly arranged in a relatively small space like the space below the swing arm.

According to the third aspect, the first catalyst device and the second catalyst device are located within the width of the swing arm in the width direction with respect to the front-rear direction of the saddle-ride type vehicle, and this can substantially prevent a case where the leg of the driver is located closer to the catalyst devices than the swing arm is in the case where the foot of the driver is placed on the road surface when the vehicle is stopped or other cases.

According to the fourth aspect, the multi-cylinder engine is the V-type engine in which left and right V banks are arranged in the width direction, the exhaust flow passages are formed of the exhaust pipes, the inlet of the exhaust pipe forming the left exhaust flow passage is attached to the left side surface of the multi-cylinder engine, the inlet of the exhaust pipe forming the right exhaust flow passage is attached to the right side surface of the multi-cylinder engine, the vehicle body has the vehicle body frame, the silencers are attached to the vehicle body frame, and the saddle-ride type vehicle includes the stay portion joining the first catalyst device and the second catalyst device to each other.

In a case where the engine is a V-type longitudinal engine, the left exhaust pipe and the corresponding silencer or the right exhaust pipe and the corresponding silencer among the left and right exhaust system parts are attached to the side surface of the engine and the side portion of the vehicle body, and the first catalyst device or the second catalyst device provided between the engine and the corresponding silencer is arranged on the vehicle body center side via the exhaust pipe. Specifically, since the first catalyst device or the second catalyst device are attached in a cantilever manner, the first catalyst device and the second catalyst device have a structure likely to vibrate in an up-down direction with the attachment portions of the exhaust system parts on the vehicle body side being a supporting point. Accordingly, the upward and downward vibrations of the first catalyst device and the second catalyst device can be easily suppressed by fixing the first catalyst device and the adjacent second catalyst device to each other by the stay portion. The left and right exhaust system parts can be thus attached with high support stiffness in a simple configuration.

According to the fifth aspect, there is provided the connecting pipe connecting the portion of the side surface of at least one of the first catalyst device and the second catalyst device which faces an outer side of the saddle-ride type vehicle in the width direction with respect to the front-rear direction of the saddle-ride type vehicle and the portion of the side surfaces of the corresponding silencer which faces the inner side of the saddle-ride type vehicle in the width direction with respect to the front-rear direction of the saddle-ride type vehicle.

Accordingly, it is possible to employ a configuration in which there is no connecting pipe on a front end side of the silencers in the front-rear direction of the saddle-ride type vehicle. Thus, a space for disposing the leg of the driver when the vehicle is stopped can be more easily secured.

According to the sixth aspect, the exhaust flow passages are formed of exhaust pipes, at least one of the first catalyst device and the second catalyst device includes the hollow tubular catalyst chamber and the catalyst main body disposed in the catalyst chamber along the front-rear direction, the exhaust pipe upstream of the at least one of the first catalyst device and the second catalyst device is connected to the portion of the side surface of the catalyst chamber which faces the outer side of the saddle-ride type vehicle in the width direction with respect to the front-rear direction of the saddle-ride type vehicle.

Thus, the exhaust flow in the exhaust pipe enters the tubular catalyst chamber from the side surfaces and a flow rotating in a tubular space of the catalyst chamber is generated. Thereafter, the exhaust flow enters the catalyst. Accordingly, the exhaust flow is prevented from unevenly flowing to one portion of the catalyst main body and the entire catalyst main body can be effectively used.

According to the seventh aspect, at least one of the first catalyst device and the second catalyst device and the corresponding silencer are arranged in the positional relationship overlapping each other in the side view and in the positional relationship in which at least one of the arm portions is interposed therebetween in the plan view.

Accordingly, the first catalyst device and the corresponding silencer are arranged to be offset from each other in the left-right direction of the vehicle or the second catalyst device and the corresponding silencer are arranged to be offset from each other in the left-right direction of the vehicle. Hence, the entire system can be made compact.

BRIEF DESCRIPTION OF THE DRAWINGS

The advantages of the invention will become apparent in the following description taken in conjunction with the drawings, wherein.

DETAILED DESCRIPTION OF THE INVENTION

An embodiment of the present invention is described below with reference to the drawings.

Figure 1:
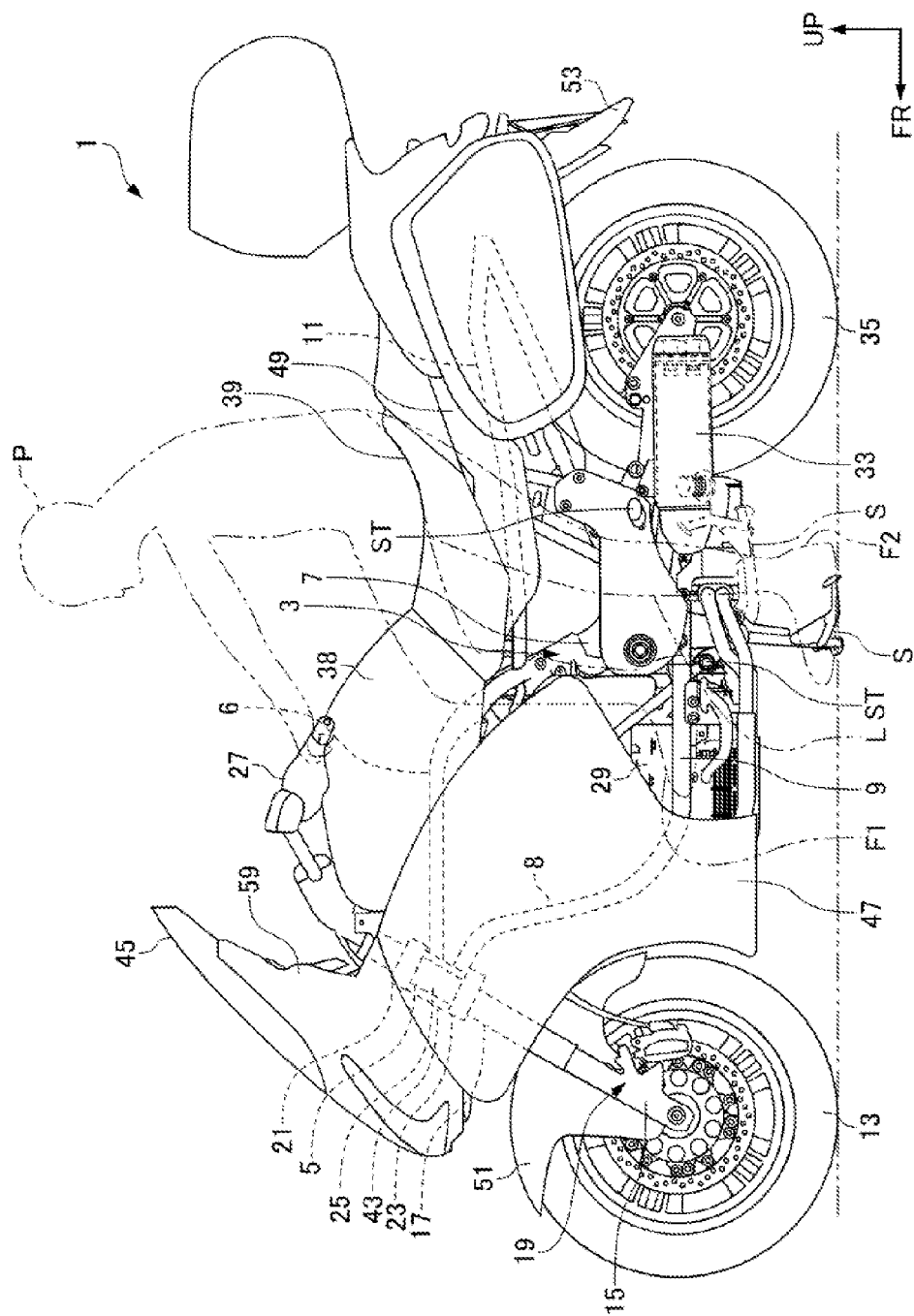
FIG. 1 is a left view showing a motorcycle which is a saddle-ride type vehicle.
Figure 2:
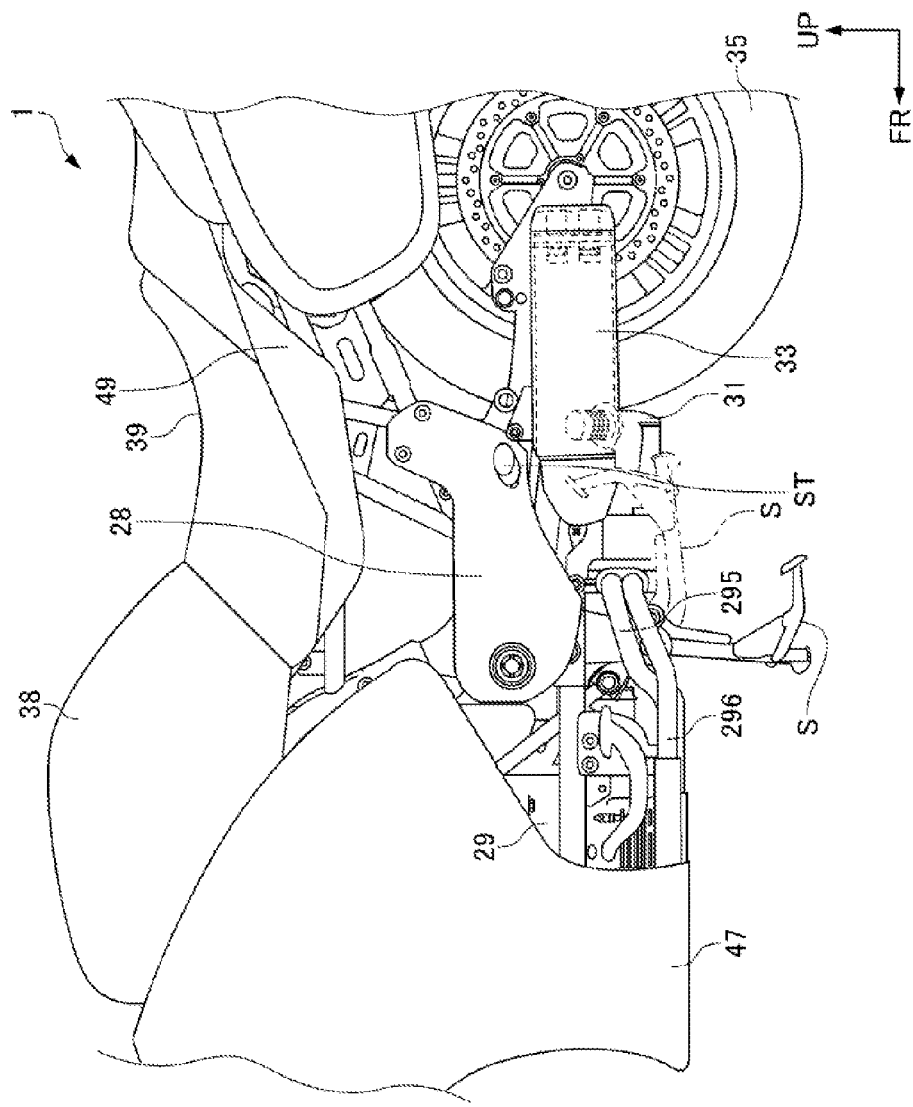
FIG. 2 is an enlarged left view of the motorcycle shown in FIG. 1.
Figure 3:
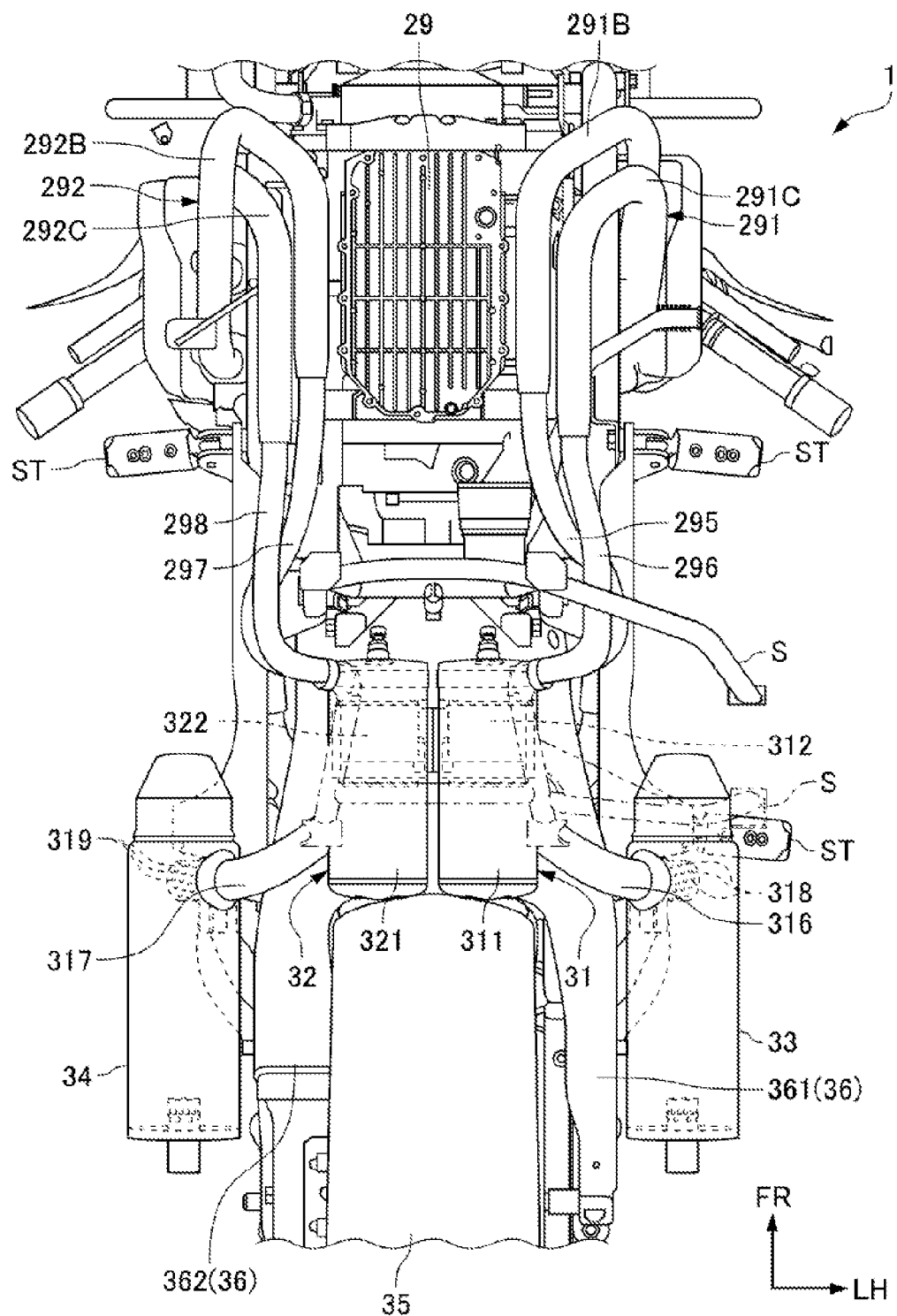
FIG. 3 is an enlarged bottom view of the motorcycle shown in FIG. 1.
Figure 4:
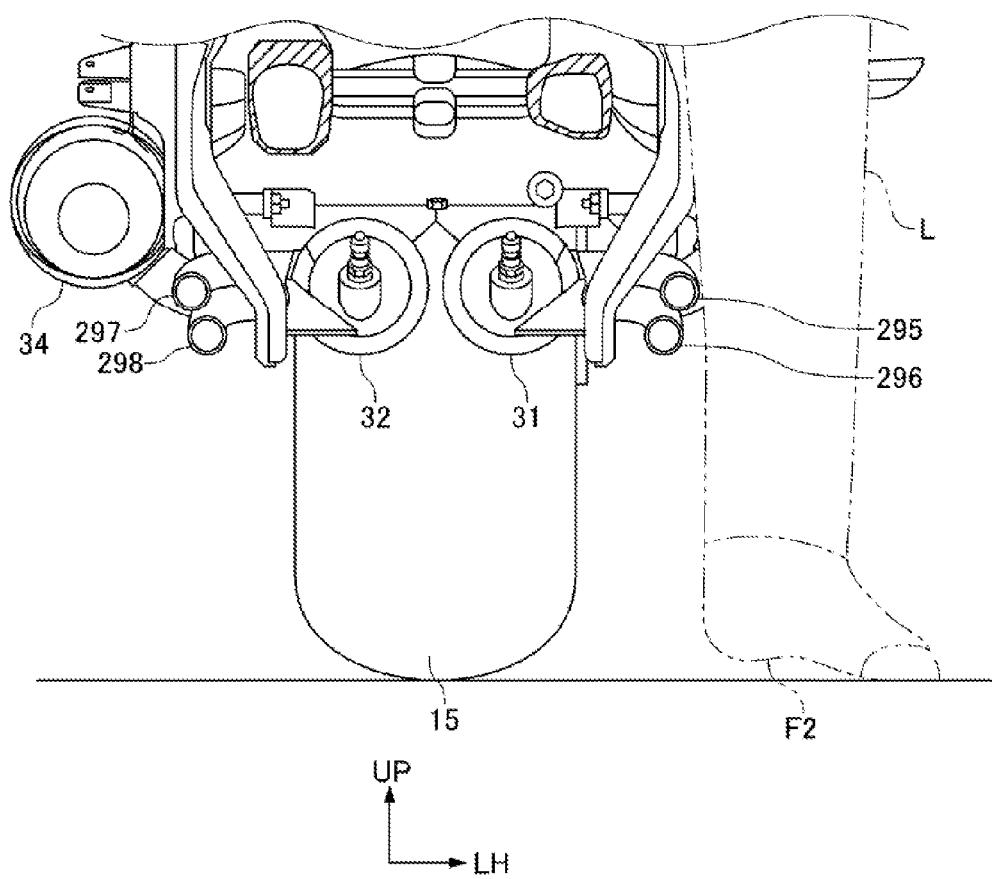
FIG. 4 is an enlarged front cross-sectional view of the motorcycle shown in FIG. 1.
Figure 5:
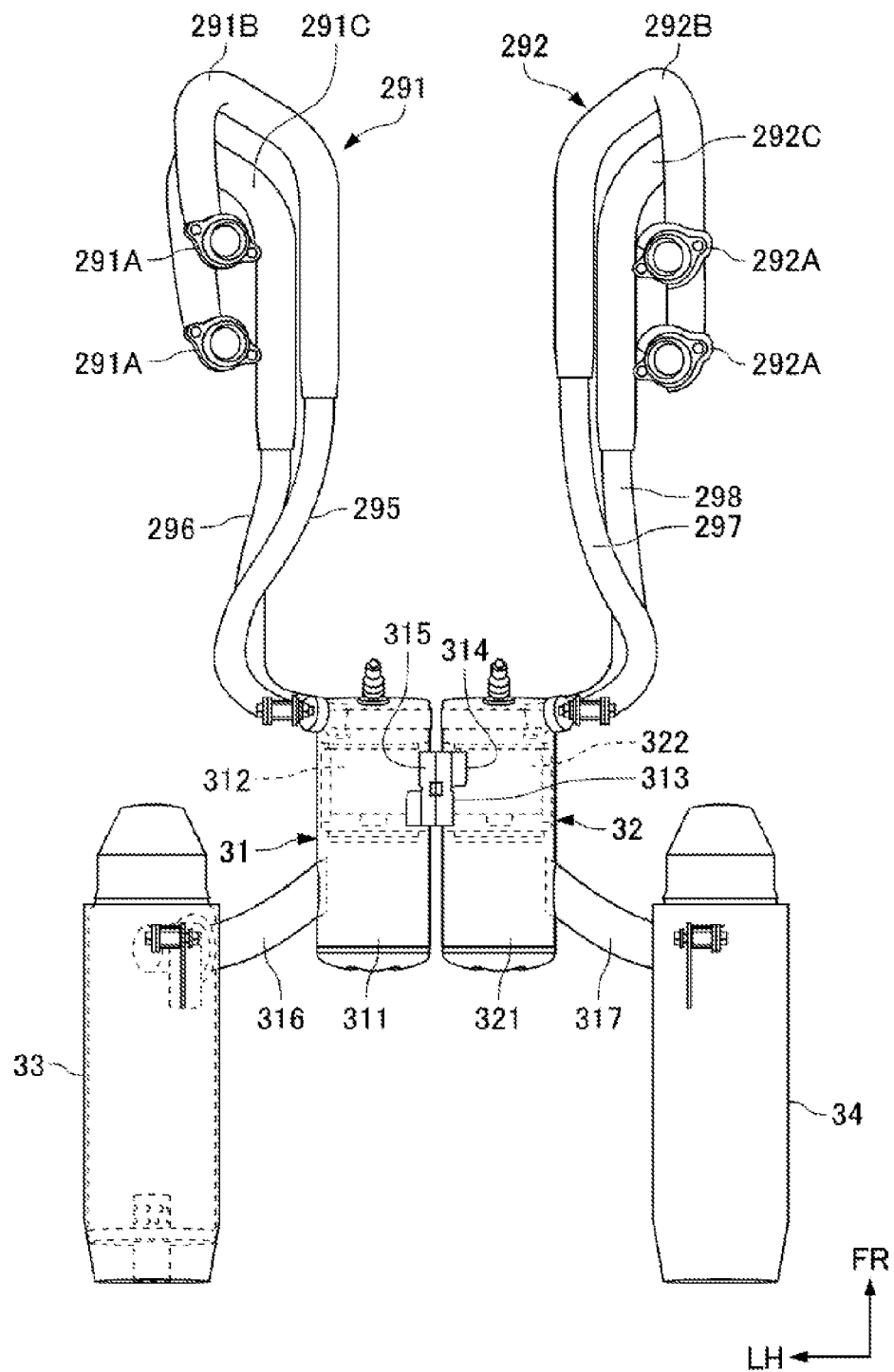
FIG. 5 is a plan view showing a first catalyst device, a second catalyst device, silencers, and the like of the motorcycle shown in FIG. 1.
Figure 6:
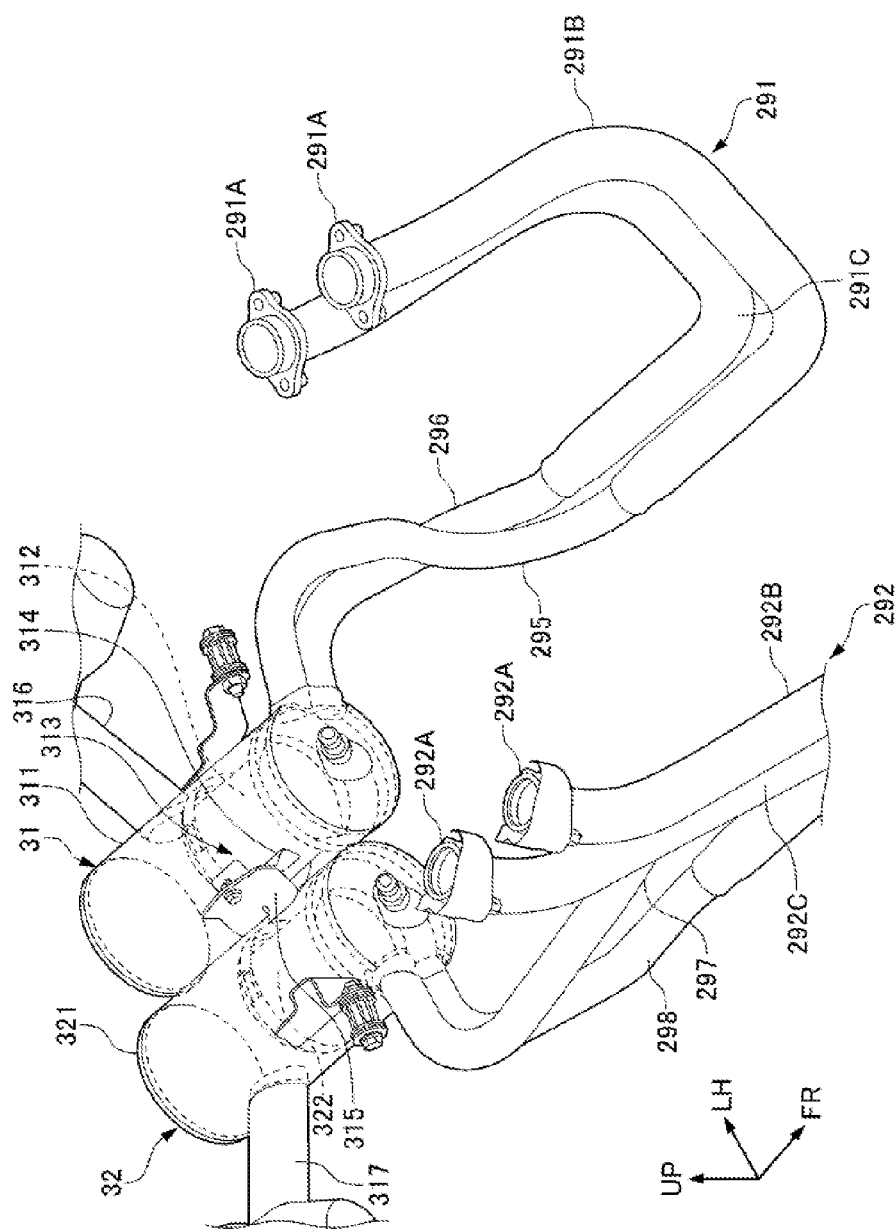
FIG. 6 is a perspective view showing the first catalyst device, the second catalyst device, and the like of the motorcycle shown in FIG. 1.
Figure 7:
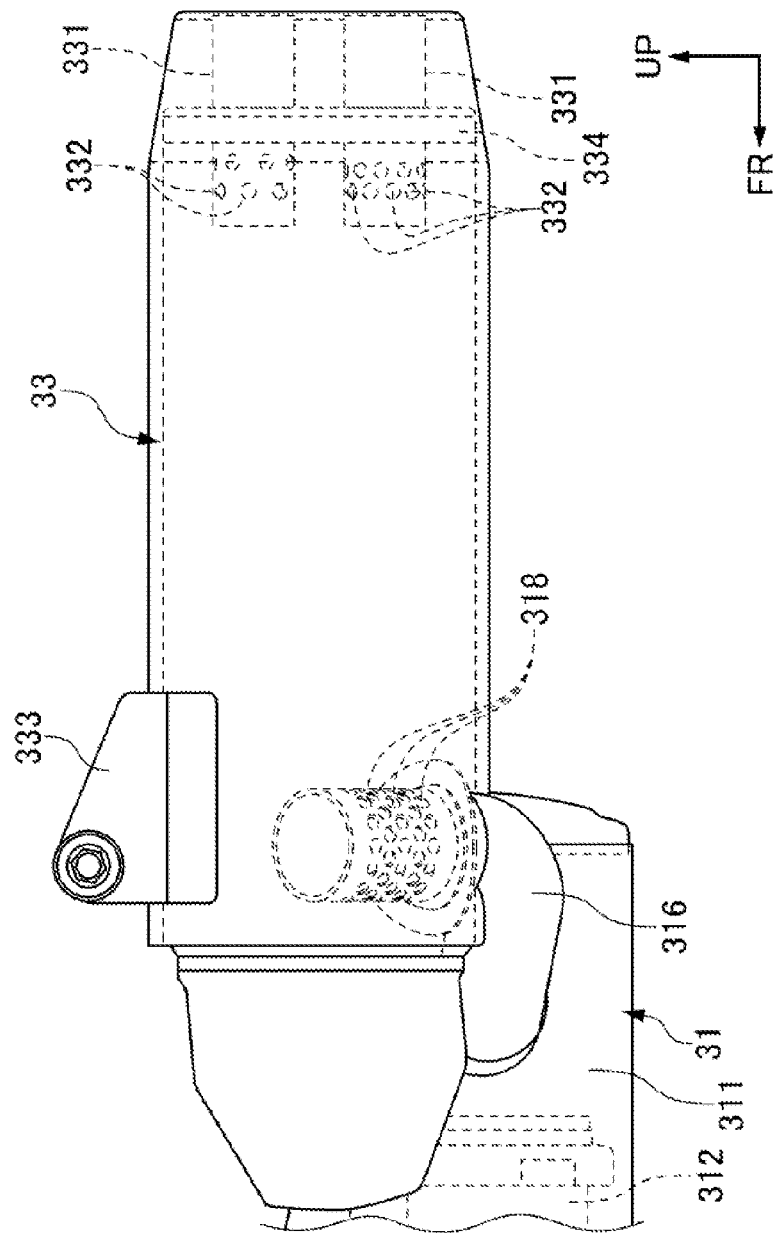
FIG. 7 is an enlarged left view showing the silencer of the motorcycle shown in FIG. 1.

First, an overall configuration of a motorcycle 1 which is a saddle-ride type vehicle of the embodiment of the present invention is described with reference to FIGS. 1 to 7. FIG. 1 is a left view showing the motorcycle 1 which is the saddle-ride type vehicle of the embodiment of the present invention. FIG. 2 is an enlarged left view of the motorcycle 1 shown in FIG. 1. FIG. 3 is an enlarged bottom view of the motorcycle 1 shown in FIG. 1. FIG. 4 is an enlarged front cross-sectional view of the motorcycle 1 shown in FIG. 1. FIG. 5 is a plan view showing a first catalyst device 31, a second catalyst device 32, silencers 33, 34, and the like of the motorcycle 1 shown in FIG. 1. FIG. 6 is a perspective view showing the first catalyst device 31, the second catalyst device 32, and the like of the motorcycle shown in FIG. 1. FIG. 7 is an enlarged left view showing the silencer 33 of the motorcycle shown in FIG. 1.

In the following description, directions of front, rear, left, right, up, and down each indicate a direction seen from a rider (driver P) riding on the motorcycle 1, unless otherwise noted. Moreover, in the drawings, the arrow FR indicates a front side of the vehicle, the arrow LH indicates a left side of the vehicle, the arrow RH indicates a right side of the vehicle, and the arrow UP indicates an upper side of the vehicle.

As shown in FIG. 1, the motorcycle 1 of the embodiment mainly includes a vehicle body frame 3, a front wheel 13, a rear wheel 35, an engine 29, the silencers 33 and 34 (see FIGS. 3 and 5), a fuel tank 38, and a center stand S.

The vehicle body frame 3 includes a head pipe 5, main tubes 6, a center tube 7, down tubes 8, under tubes 9, and a seat rail 11. A pair of the left and right main tubes 6 are provided and extend obliquely rearward from the head pipe 5. The center tube 7 extends downward from rear ends of the main tubes 6. The seat rail 11 extends rearward from the main tubes 6.

Moreover, a pair of the left and right down tubes 8 are provided. The pair of down tubes 8 are disposed below the main tubes 6. The pair of down tubes 8 are connected to the head pipe 5 at their front end portions in a side view. Rear end portions of the pair of down tubes 8 extend obliquely downward and rearward from the head pipe 5.

A pair of the left and right under tubes 9 are provided. Front end portions of the pair of under tubes 9 are connected to lower ends of the pair of down tubes 8. Rear end portions of the pair of under tubes 9 extend rearward from the pair of down tubes 8. Moreover, a step ST is provided in the vehicle body frame 3.

As shown by two-dot chain lines in FIGS. 1 to 3, the center stand S is attached to a lower end portion of the center tube 7. The center stand S is supported by the center tube 7 to be raised and lowered in such a way that the center stand S can be stored in a vehicle body lower portion and made to stand upright on the ground as shown by solid lines in FIGS. 1 to 3. The center stand S can support the vehicle body frame 3 by being made to stand upright.

The front wheel 13 is pivotally supported by left and right front forks 19, 19 each including an outer tube 15 and an inner tube 17. Upper portions of the inner tubes 17 are supported by a top bridge 21 and a bottom bridge 23. A steering stem 25 is inserted in the head pipe 5 in the upper portions of the inner tubes 17. The steering stem 25 is connected to the top bridge 21 and the bottom bridge 23. The front wheel 13 can be steered by using a handle 27 provided on the top bridge 21.

The engine 29 is, for example, a multi-cylinder engine of a four-cylinder V-type in which V banks are arranged in a width direction with respect to a front-rear direction of the motorcycle 1 which is the saddle-ride type vehicle, i.e. in a left-right direction. The engine 29 is supported by the main tubes 6 and the center tube 7. A swing arm 36 (see FIG. 3) is connected to the center tube 7. As shown in FIG. 3, portions of the swing arm 36 forming a pair in the left-right direction extend rearward from the center tube 7 and the rear wheel 35 is swingably and rotatably supported by these portions. The rear wheel 35 is driven by drive force of the engine 29 via, for example, a drive shaft (not illustrated).

The fuel tank 38 is fixed on the main tubes 6. A seat 39 is fixed on the seat rail 11. A radiator (not illustrated) is provided in a portion on an oblique front side of the engine 29 and behind the front forks 19, 19 to be fixed to the vehicle body frame 3.

Moreover, the motorcycle 1 includes a front cowl (cowling) 43, a windscreen (screen) 45, a side cowl 47, a seat cowl 49, a front fender 51, and a rear fender 53. The front cowl (cowling) 43 is disposed in a front portion of the motorcycle 1 and covers a front portion and the like of the vehicle body frame. The windscreen (screen) 45 is attached to an upper portion of the front cowl 43. The side cowl 47 is disposed in side portions of the motorcycle 1 and covers the engine 29 and the like. The seat cowl 49 covers a portion below the seat 39 in the motorcycle 1. The front fender 51 covers an upper portion of the front wheel 13. The rear fender 53 covers an upper portion of the rear wheel 35. The motorcycle 1 is a motorcycle with full fairing.

A pair of mirror covers 59 covering rear-view mirrors (not illustrated) and including turn signals are attached to left and right sides of the front cowl 43. An air guide plate (not illustrated) for guiding a travelling wind upward and rearward is attached to an upper edge portion of the front cowl 43. A meter visor (not illustrated) is attached behind the air guide plate.

Next, configurations of exhaust system parts of the motorcycle 1 are described in detail. As shown in FIG. 5, the exhaust system parts include a first front exhaust pipe 291, a second front exhaust pipe 292, first upstream exhaust pipes 295 and 296, second upstream exhaust pipes 297 and 298, the first catalyst device 31, the second catalyst device 32, connecting pipes 316 and 317, and the silencers 33 and 34. Exhaust flow passages independently disposed on left and right sides of the vehicle body are formed by these parts.

The first front exhaust pipe 291 has attachment portions 291A, a front cylinder exhaust pipe 291B, and a rear cylinder exhaust pipe 291C. One end portion of the front cylinder exhaust pipe 291B and one end portion of the rear cylinder exhaust pipe 291C which are inlets of exhaust pipes are attached respectively to exhaust ports of a cylinder head of the two cylinders on a left side surface of the engine 29, by the attachment portions 291A. The other end portion of the front cylinder exhaust pipe 291B and the other end portion of the rear cylinder exhaust pipe 291C are connected respectively to front end portions of the first upstream exhaust pipes 295 and 296.

The second front exhaust pipe 292 has attachment portions 292A, a front cylinder exhaust pipe 292B, and a rear cylinder exhaust pipe 292C. One end portion of the front cylinder exhaust pipe 292B and one end portion of the rear cylinder exhaust pipe 292C which are inlets of exhaust pipes are attached respectively to exhaust ports of a cylinder head of the two cylinders on a right side surface of the engine 29, by the attachment portions 292A. The other end portion of the front cylinder exhaust pipe 292B and the other end portion of the rear cylinder exhaust pipe 292C are connected respectively to front end portions of the second upstream exhaust pipes 297 and 298.

The first catalyst device 31 is provided in the middle of the exhaust flow passage on the left side of the vehicle body. The second catalyst device 32 is provided in the middle of the exhaust flow passage on the right side of the vehicle body. As shown in FIGS. 2 to 4, the first catalyst device 31 and the second catalyst device 32 are arranged side by side below the swing arm 36.

More specifically as shown in FIG. 3, the first catalyst device 31 and the second catalyst device 32 are arranged adjacent to each other in the left-right direction with the longitudinal direction of the first catalyst device 31 and the longitudinal direction of the second catalyst device 32 being along the front-rear direction. Moreover, the first catalyst device 31 and the second catalyst device 32 are arranged within the width of the swing arm 36 in the width detection with respect to the front-rear direction of the motorcycle 1 which is the saddle-ride type vehicle, i.e. in the left-right direction. Specifically, as shown in FIG. 3, the first catalyst device 31 and the second catalyst device 32 are arranged between a first arm portion 361 and a second arm portion 362 of the swing arm 36 in a bottom view (or a plan view).

As shown in FIG. 2 and other drawings, the first catalyst device 31 and the silencer 33 are arranged in a positional relationship overlapping each other in a side view. Moreover, as shown in FIG. 3, the first catalyst device 31 and the silencer 33 are arranged in a positional relationship in which the first arm portion 361 of the swing arm 36 is interposed therebetween in the bottom view (or the plan view). Similarly, the second catalyst device 32 and the silencer 34 are arranged in a positional relationship overlapping each other in the side view. Moreover, as shown in FIG. 3, the second catalyst device 32 and the silencer 34 are arranged in a positional relationship in which the second arm portion 362 of the swing arm 36 is interposed therebetween in the bottom view (or the plan view).

The first catalyst device 31 includes a catalyst chamber 311 and a catalyst main body 312. Similarly the second catalyst device 32 includes a catalyst chamber 321 and a catalyst main body 322. The catalyst chambers 311 and 321 each have a hollow tubular shape. A longitudinal direction Which is an axis direction of each of the catalyst chambers 311 and 321 is parallel to the front rear direction. In the front-rear direction, front ends of the catalyst chambers 311 and 321 coincide with each other and rear ends of the catalyst chambers 311 and 321 coincide with each other.

As shown in FIGS. 5 and 6, the catalyst chamber 311 and the catalyst chamber 321 are joined to each other by a stay portion 313 and are thus integrated. The stay portion 313 has a first stay portion 314 and a second stay portion 315. The first stay portion 314 is joined to the catalyst chamber 311 and the second stay portion 315 is joined to the catalyst chamber 321. The first stay portion 314 and the second stay portion 315 are fixed to each other by a screw and are thus integrated.

The catalyst main bodies 312 and 322 are disposed in front portions of interior spaces of the catalyst chambers 311 and 321 at positions rearward from the front ends of the catalyst chambers 311 and 321 by a distance substantially equal to the pipe diameter of the upstream exhaust pipes 295, 296, 297 and 298. The catalyst main bodies 312 and 322 are arranged with the longitudinal directions of the catalyst main bodies 312 and 322 being along the front-rear direction.

The catalyst main bodies 312 and 322 have catalysts (see FIG. 5) made of platinum, rhodium, and the like. Exhaust gas passing through the catalyst chambers 311 and 321 can be purified by the catalysts. Rear end portions of the first upstream exhaust pipes 295 and 296 which are portions of the exhaust pipes upstream of the first catalyst device 31 are joined to a side surface of the catalyst chamber 311. Similarly, rear end portions of the second upstream exhaust pipes 297 and 298 which are portions of exhaust pipes upstream of the second catalyst device 32 are joined to a side surface of the catalyst chamber 321. More specifically, the joining positions are positions in portions of the catalyst chambers 311 and 321, the portions located in front of front ends of the catalyst main bodies 312 and 322.

The first upstream exhaust pipes 295 and 296 are joined to a left side surface of the catalyst chamber 311. Meanwhile, the second upstream exhaust pipes 297 and 298 are joined to a right side surface of the catalyst chamber 321.

As shown in FIG. 5 and other drawings, the silencers 33 and 34 are connected respectively to the first catalyst device 31 and the second catalyst device 32 by the connecting pipes 316 and 317 as described above. Specifically, the silencer 33 is provided in a portion of the left exhaust flow passage downstream of the first catalyst device 31. Moreover, the silencer 34 is provided in a portion of the right exhaust flow passage downstream of the second catalyst device 32.

Specifically, the catalyst chambers 311 and 321 are connected to the silencers 33 and 34 via the connecting pipes 316 and 317.

One end portion of the connecting pipe 316 is connected to a portion of the first catalyst device 31 which faces the outer side, i.e. a rear portion of the left side surface of the first catalyst device 31. One end portion of the connecting pipe 317 is connected to a portion of the second catalyst device 32 which faces the outer side, i.e. a rear portion of the right side surface of the second catalyst device 32.

The other end portions of the connecting pipes 316 and 317 are connected respectively to inner surfaces of the silencers 33 and 34 in the vehicle width direction.

More specifically, the other end portion of the connecting pipe 316 is connected to a front portion of a right side surface of the silencer 33. The other end portion of the connecting pipe 316 extends into an interior space of the silencer 33. The other end portion of the connecting pipe 317 is connected to a front portion of a left side surface of the silencer 34. The other end portion of the connecting pipe 317 extends into an interior space of the silencer 34.

The other ends of the connecting pipes 316 and 317 are closed. As shown in FIG. 7, multiple communication holes 318 and 319 by which the insides and the outsides of the connecting pipes 316 and 317 communicate with each other are formed in side surfaces of the connecting pipes 316 and 317 Which are located in the interior spaces of the silencers 33 and 34.

The silencers 33 and 34 have a positional relationship Which is left-right symmetric with respect to the center of the vehicle body of the motorcycle 1 in the left-right direction. Hence, description is given below only of the left silencer 33 and description of the right silencer 34 is omitted.

The silencer 33 has a hollow tubular shape. Both ends of the silencer 33 in an axial direction thereof are closed. In the space inside the silencer 33, discharge pipes 331 are provided at a rear end of the silencer 33. The discharge pipes 331 are closed at front ends and are opened at rear ends. The discharge pipes 331 penetrate a lid member 334 closing the rear end of the silencer 33. The front half of each discharge pipe 331 is disposed in the interior space of the silencer 33 while the rear half of the discharge pipe 331 is exposed to the outside of the silencer 33. Multiple communication holes 332 are formed in a side surface of the front half of each discharge pipe 331.

As shown in FIG. 7, the silencer 33 includes a supporting portion 333. One end portion of the supporting portion 333 is joined to the silencer 33 while the other end portion is fixed to a pinion step bracket 28 with a screw as shown in FIG. 2, the pinion step bracket 28 being fixed to the vehicle body frame 3. Accordingly, the silencers 33 and 34 are each attached to the vehicle body frame 3 via the supporting portion 333 and the pinion step bracket 28.

In the embodiment of the present invention, the following effects can be obtained.

Since the first catalyst device 31 and the second catalyst device 32 are arranged side by side below the swing arm 36, the first catalyst device 31 and the second catalyst device 32 having the large catalyst main bodies 312 and 322 can be compactly arranged in a dead space below the swing arm 36. Accordingly, as shown by the two-dot chain lines in FIGS. 1 and 4, when the motorcycle 1 is stopped, it is possible to arrange the first catalyst device 31 and the second catalyst device 32 away from the position of the leg L of the driver P of the motorcycle 1 in the case where the driver P of the motorcycle 1 removes his/her foot F2 from the step when the motorcycle 1 is stopped or other cases and puts his/her foot F2 on the road surface, and also to maintain the excellent reach to the ground.

Moreover, since the first catalyst device 31 and the second catalyst device 32 are arranged adjacent to each other with the longitudinal direction of the first catalyst device 31 and the longitudinal direction of the second catalyst device 32 being along the front-rear direction of the motorcycle 1, the first catalyst device 31, the second catalyst device 32, and the exhaust flow passages can have simple structures. In addition, the two of the first catalyst device 31 and the second catalyst device 32 can be compactly arranged in a relatively small space like the space below the swing arm 36.

Furthermore, the first catalyst device 31 and the second catalyst device 32 are located within the width of the swing arm 36 in the width direction (left-right direction) with respect to the front-rear direction of the motorcycle 1, and this can substantially prevent a case where the leg L of the driver P is located closer to the catalyst devices than the swing arm 36 is when the motorcycle 1 is stopped or other cases.

Moreover, the multi-cylinder engine is the V-type engine 29 in which the V banks are arranged in the width direction (left-right direction) with respect to the front-rear direction of the motorcycle 1, the exhaust flow passages are formed of the exhaust pipes, the inlet of the exhaust pipe forming the left exhaust flow passage is attached to the left side surface of the multi-cylinder engine, the inlet of the exhaust pipe forming the right exhaust flow passage is attached to the right side surface of the multi-cylinder engine, the vehicle body has the vehicle body frame 3, the silencers 33 and 34 are attached to the vehicle body frame 3, and the motorcycle 1 which is the saddle-ride type vehicle includes the stay portion 313 joining the first catalyst device 31 and the second catalyst device 32 to each other.

In a case where the engine 29 is a V-type longitudinal engine, the left exhaust pipe (the first front exhaust pipe 291, the first upstream exhaust pipe 295, the first upstream exhaust pipe 296, and the connecting pipe 316) and the silencer 33 among the left and right exhaust system parts are attached to the left side surface of the engine 29 and the left portion of the vehicle body, and the first catalyst device 31 provided between the engine 29 and the silencer 33 are arranged on the vehicle body center side via the exhaust pipe. Similarly the second catalyst device 32, the right exhaust pipe (the second front exhaust pipe 292, the second upstream exhaust pipe 297, the second upstream exhaust pipe 298, and the connecting pipe 317) and the silencer 34 are attached to the right side surface of the engine 29 and the right portion of the vehicle body, and the second catalyst device 32 provided between the engine 29 and the silencer 34 is arranged on the vehicle body center side via the exhaust pipe.

Specifically, since the first catalyst device 31 and the second catalyst device 32 are attached in a cantilever manner, the first catalyst device 31 and the second catalyst device 32 have a structure likely to vibrate in an up-down direction with the attachment portions of the exhaust system parts on the vehicle body side being a supporting point. Accordingly, the upward and downward vibrations of the first catalyst device 31 and the second catalyst device 32 can be easily suppressed by fixing the first catalyst device 31 and the adjacent second catalyst device 32 to each other by the stay portion 313. The left and right exhaust system parts can be thus attached with high support stiffness in a simple configuration.

There are provided the connecting pipes 316 and 317 connecting the portions of the side surfaces of the first catalyst device 31 and the second catalyst device 32 which face the outer sides of the motorcycle 1 in the width direction (left-right direction) with respect to the front-rear direction of the motorcycle 1 and the portions of the side surfaces of the silencers 33 and 34 which face the inner sides of the motorcycle 1 in the width direction (left-right direction) with respect to the front-rear direction of the motorcycle 1.

Accordingly, it is possible to employ a configuration in which there are no connecting pipes 316 and 317 on the front end sides of the silencers 33 and 34 in the front-rear direction of the motorcycle 1. This can further facilitate securing of a space between each of the silencers 33 and 34 and the corresponding step which is used to dispose the leg L of the driver P in a case where the foot F2 of the driver P is put on the road surface when the motorcycle 1 is stopped.

Moreover, the first catalyst device 31 and the second catalyst device 32 include the hollow tubular catalyst chambers 311 and 321 and the catalyst main bodies 312 and 322 disposed in the catalyst chambers 311 and 321 along the front-rear direction. The exhaust pipes upstream of the first catalyst device 31 and the second catalyst device 32 are connected to the portions of the side surfaces of the catalyst chambers 311 and 321 which face the outer sides of the motorcycle 1 in the width direction (left-right direction) with respect to the front-rear direction of the motorcycle 1.

Thus, the exhaust flows in the exhaust pipes enter the tubular catalyst chambers 311, 321 from the side surfaces and flows rotating in the tubular spaces of the catalyst chambers 311, 321 are generated. Thereafter, the exhaust flows enter the catalysts. Accordingly, the exhaust flows are each prevented from unevenly flowing to one portion of the corresponding one of the catalyst main bodies 312, 322 and the entire catalyst main bodies 312, 322 can be effectively used.

Moreover, the first catalyst device 31 and the silencer 33 are arranged in the positional relationship overlapping each other in the side view and in the positional relationship in which the arm portion 361 is interposed therebetween in the plan view. Moreover, the second catalyst device 32 and the silencer 34 are arranged in the positional relationship overlapping each other in the side view and in the positional relationship in which the other arm portion 362 is interposed therebetween in the plan view.

Accordingly, the first catalyst device 31 and the silencer 33 are arranged to be offset from each other in the left-right direction of the vehicle or the second catalyst device 32 and the silencer 34 are arranged to be offset from each other in the left-right direction of the vehicle. Hence, the entire system can be made compact.

<Modified Example>

In the embodiment described above, description is given of the case where the present invention is applied to the motorcycle 1. However, the present invention is not limited to a motorcycle and can be applied to a tricycle or other saddle-ride type vehicles.

Moreover, the connecting pipes 316 and 317 are connected to the portions of the side surfaces of the first catalyst device 31 and the second catalyst device 32 which face the outer sides of the motorcycle 1 in the width direction (left-right direction) with respect to the front-rear direction of the motorcycle 1, but the present invention is not limited to this configuration. The connecting pipes can be connected to at least one of the first catalyst device 31 and the second catalyst device 32.

Moreover, the connecting pipes 316 and 317 are connected to the portions of the side surfaces of the silencers 33 and 34 which face the inner sides of the motorcycle 1 in the width direction (left-right direction) with respect to the front-rear direction of the motorcycle 1, but the present invention is not limited to this configuration. The connecting pipes can be connected to the portion of one of the silencers 33 and 34 which faces the inner side of the motorcycle 1.

The first catalyst device 31 and the second catalyst device 32 include the hollow tubular catalyst chambers 311 and 321 and the catalyst main bodies 312 and 322 disposed in the catalyst chambers 311 and 321 along in the front-rear direction, but the present invention is not limited to this configuration. Only one of the first catalyst device 31 and the second catalyst device 32 can include the catalyst chamber and the catalyst main body.

Moreover, the first catalyst device 31 and the silencer 33 are arranged in the positional relationship overlapping each other in the side view and in the position relationship in which the one arm portion 361 is interposed therebetween in the plan view. Furthermore, the second catalyst device 32 and the silencer 34 are arranged in the positional relationship overlapping each other in the side view and in the positional relationship in which the other arm portion 362 is interposed therebetween in the plan view. However, such positional relationships are not required to be set for both of the first arm portion 361 and the second an portion 362 and can be set only for one of the arm portions.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A saddle-ride type vehicle, comprising:
a multi-cylinder engine;
a swing arm pivotally supporting a rear wheel such that said rear wheel is swingable;
a left exhaust flow passage and a right exhaust flow passage, connected to said multi-cylinder engine and disposed independently on left and right sides of a vehicle body;
a first catalyst device provided in a middle of said left exhaust flow passage;
a second catalyst device provided in a middle of said right exhaust flow passage;
a first silencer connected to a portion of said left exhaust flow passage, downstream of said first catalyst device; and
a second silencer connected to a portion of said right exhaust flow passage, downstream of said second catalyst device;
wherein said first catalyst device and said second catalyst device are disposed side by-side directly below said swing arm, and
wherein said first catalyst device and said second catalyst device are disposed adjacent to each other, with longitudinal directions thereof being along a front-rear direction of the saddle-ride type vehicle.

2. The saddle-ride type vehicle according to claim 1, wherein said first catalyst device and said second catalyst device are arranged within a width of said swing arm in a width direction of the saddle-ride type vehicle.

3. The saddle-ride type vehicle according to claim 1,
wherein said multi-cylinder engine is a V-type engine in which left and right V banks are arranged in a vehicle width direction,
wherein said left exhaust flow passage comprises a left exhaust pipe and said right exhaust flow passage comprises a right exhaust pipe,
wherein an inlet of said left exhaust pipe is attached to a left side surface of said multi-cylinder engine,
wherein an inlet of said right exhaust pipe is attached to a right side surface of said multi-cylinder engine, and
wherein said vehicle body includes a vehicle body frame,
wherein said first silencer and said second silencer are each attached to said vehicle body frame, and
wherein the saddle-ride type vehicle further comprises a stay portion joining said first catalyst device and said second catalyst device to each other.

4. The saddle-ride type vehicle according to claim 1, wherein the saddle-ride type vehicle further comprises a connecting pipe connecting a portion of a side surface of at least one of said first catalyst device and said second catalyst device which faces an outer side of the saddle-ride type vehicle in a width direction and a portion of a side surface of a corresponding one of the first and second silencers which faces an inner side of the saddle-ride type vehicle in the width direction.

5. The saddle-ride type vehicle according to claim 1,
wherein said left exhaust flow passage and said right exhaust flow passage each comprise an exhaust pipe,
wherein at least one of said first catalyst device and said second catalyst device comprises a hollow tubular catalyst chamber and a catalyst main body disposed in said hollow tubular catalyst chamber, along the front-rear direction, and
wherein the exhaust pipe upstream of said at least one of said first catalyst device and said second catalyst device is connected to a portion of a side surface of said hollow tubular catalyst chamber which faces an outer side of the saddle-ride type vehicle in a width direction.

6. The saddle-ride type vehicle according to claim 1,
wherein said swing arm comprises a pair of left and right arm portions extending toward a rear of the saddle-ride type vehicle, and
wherein at least one of said first catalyst device and said second catalyst device and a corresponding one of the first and second silencers are disposed in a positional relationship overlapping each other in a side view, and are disposed in a positional relationship in which at least one of said arm portions is interposed therebetween in a plan view.

7. A saddle-ride type vehicle, comprising:
a multi-cylinder engine;
a swing arm pivotally supporting a rear wheel such that said rear wheel is swingable;
a left exhaust flow passage and a right exhaust flow passage, connected to said multi-cylinder engine and disposed independently on left and right sides of a vehicle body;
a first catalyst device provided in a middle of said left exhaust flow passage;
a second catalyst device provided in a middle of said right exhaust flow passage;
a first silencer connected to a portion of said left exhaust flow passage, downstream of said first catalyst device; and
a second silencer connected to a portion of said right exhaust flow passage, downstream of said second catalyst device;
wherein said first catalyst device and said second catalyst device are disposed side by-side directly below said swing arm,
wherein said swing arm comprises a pair of left and right arm portions extending toward a rear of the saddle-ride type vehicle, and
wherein at least one of said first catalyst device and said second catalyst device and a corresponding one of the first and second silencers are disposed in a positional relationship overlapping each other in a side view, and are disposed in a positional relationship in which at least one of said arm portions is interposed therebetween in a plan view.

* * * * *